Oct. 19, 1948.　　　E. A. ENGLAND　　　2,451,933
ROPE OR WIRE TIGHTENER
Filed July 22, 1946

INVENTOR.
Elmer A. England
BY
Attorney.

Patented Oct. 19, 1948

2,451,933

UNITED STATES PATENT OFFICE 2,451,933

ROPE OR WIRE TIGHTENER

Elmer A. England, Kalamazoo, Mich.

Application July 22, 1946, Serial No. 685,550

3 Claims. (Cl. 24—71.3)

This invention relates to improvements in rope or wire tighteners.

The main objects of this invention are:

First, to provide a rope or wire tightener which is well adapted for use as a tightener for clothes lines and one which may be easily manipulated to tighten the line and engage with the line so that it is not likely to become disengaged.

Second, to provide a tightener of this character which is mainly formed of wood so that the likelihood of discoloring or staining laundry is minimized and also one which is light in weight and of substantial size so that it can be easily manipulated.

Objects relating to details and economies of the invention will appear from the description to follow. The invention is defined and pointed out in the claims.

Preferred embodiments of the invention are illustrated in the accompanying drawing, in which.

Figure 3:
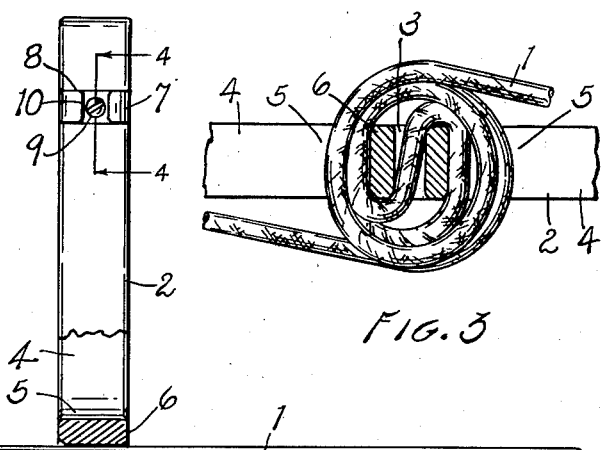
Fig. 3 is a detail sectional view illustrating further manipulation of the tightener.
Figure 2:
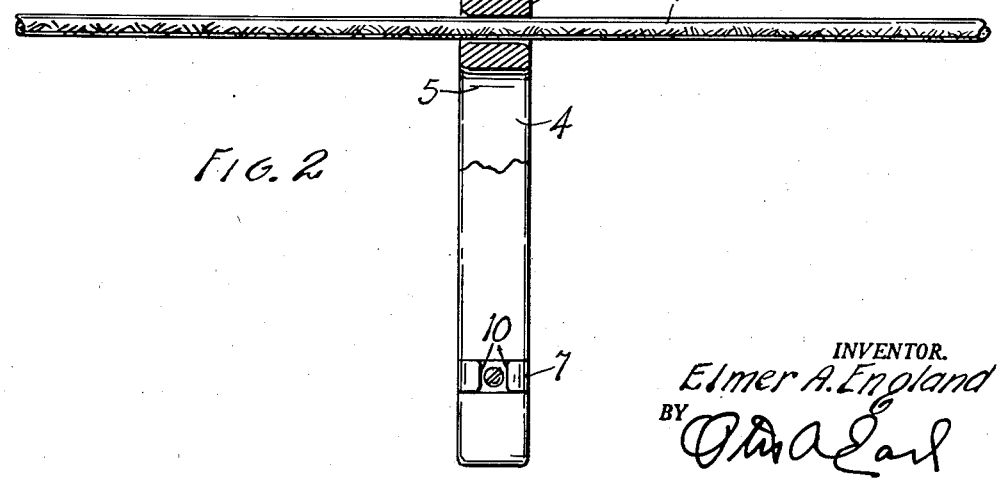
Fig. 2 is a fragmentary view partially in section illustrating the initial position of the tightener on the line—that is, prior to manipulation thereof to take-up or tension the line.

In the accompanying drawing, 1 represents a clothes line and 2 my improved tightener in operative relation to the line or rope. My improved tightener comprises a bar-like body having a hole 3 transversely therethrough and adapted to receive the rope as is shown in the drawings. The body is of substantial length and is provided with longitudinal slots 4 open at the outer ends thereof, the inner ends of the slots 5 being adjacent to but spaced from the hole 3 thereby providing a winding hub 6 around which the rope may be wound as indicated in Fig. 3.

Figure 1:
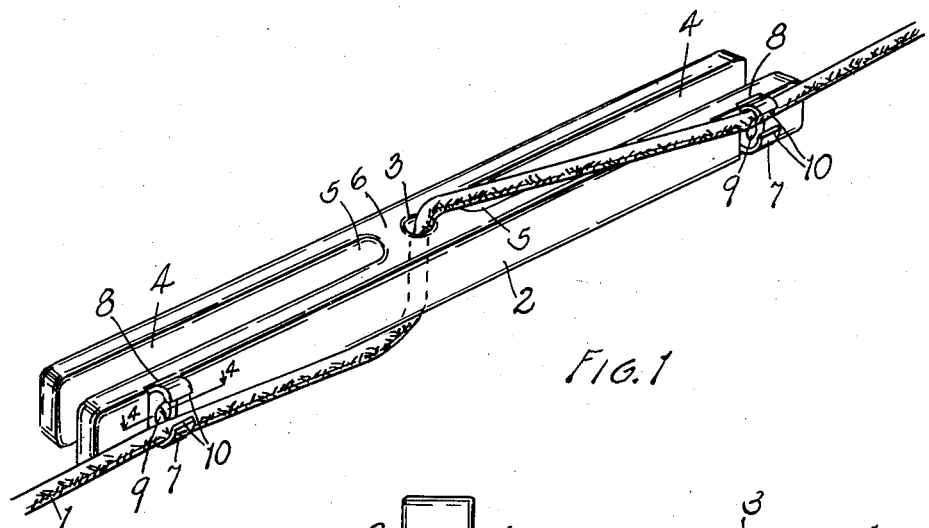
Fig. 1 is a perspective view of a tightener embodying the invention applied to a clothes line with a minimum of take-up in the line.
Figure 4:
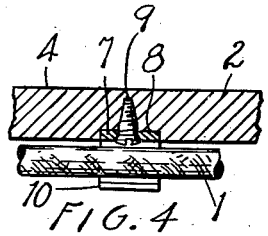
Fig. 4 is an enlarged fragmentary view in section on line 4—4 of Figs. 1 and 2 illustrating further structural details.

The body is desirably formed of wood. C-shaped clips 7 are secured in transverse recesses 8 in one side of the body adjacent the ends thereof. These recesses are of such width that they serve to support the clips laterally so that a single screw 9 serves to secure each clip. The ends of the arms 10 of the clips are spaced so that the rope can be passed between them as is indicated in Fig. 1.

In use, the rope to be tightened is passed through the hole 3 and to tighten or tension the rope the tightener is brought into general alignment with the rope and the rope engaged with the clips or holders. Where only slight tightening is required the rope may be engaged as shown in Fig. 1. However, a very considerable slack may be taken up by winding the rope around the hub portion prior to engagement of the rope with the clips, such winding being indicated in Fig. 3.

It will be noted that the recesses are of such depth that the heads of the screws are guarded thereby minimizing abrading of the rope. Desirably the rope is engaged with both clips which maintains the tightener in substantially parallel relation to the rope.

While the particular structure illustrated is designed primarily as a clothes line tightener and I have used the terms "line" or "rope," it will be understood that the tightener may be used as a wire tightener.

Having thus described my invention, what I claim as new and desire to secure by Letters Patent, is:

1. A rope or wire tightener comprising an elongated bar-like body having a central hole transversely therethrough adapted to receive a rope or wire, and longitudinal slots opening at each end thereof and terminating adjacent to but spaced from the hole providing a hub on which a rope or wire may be wound, the slots being relatively long, and outwardly facing C-shaped clips secured to a side of the body member adjacent its ends, the side of the body being transversely recessed to receive the stems of the clips with the arms of the clips projecting from the recesses, the clips being secured in the recesses by screws arranged through the sides thereof, the side edges of the recesses being in supported engagement with the side edges of the stems of the clips whereby rotative movement of the clips is prevented, the recesses being of such depth as to receive the heads of screws to minimize abrading of a rope engaged with the clips.

2. A rope or wire tightener comprising an elongated bar-like body having a central hole transversely therethrough adapted to receive a rope or wire, and longitudinal slots opening at each end thereof and terminating adjacent to but spaced from the hole providing a hub on which a rope or wire may be wound, the slots being relatively long and outwardly facing C-shaped clips secured to a side of the body member adjacent its ends, the side of the body being transversely recessed to receive the stems of the clips with the arms of the clips projecting from the recesses, the clips being secured in the recesses by screws arranged through the sides thereof, the side edges of the recesses being in supported engagement with the side edges of the stems of the clips whereby rotative movement of the clips is prevented.

3. A rope or wire tightener comprising an elongated bar-like body having a central hole transversely therethrough adapted to receive a rope or wire, and longitudinal slots opening at each end thereof and terminating adjacent to but spaced from the hole providing a hub on which a rope or wire may be wound, the slots being relatively long, and outwardly facing C-shaped clips secured to a side of the body member adjacent to but spaced from the ends thereof and opening laterally in non-communicating relation to the slots of the body member, whereby a rope or wire may be passed through the hole in the body and over opposed edges of the body and engaged with the clips.

ELMER A. ENGLAND.

REFERENCES CITED

The following references are of record in the file of this patent:

UNITED STATES PATENTS

| Number | Name | Date |
| --- | --- | --- |
| 1,725,130 | Ciferskor | Aug. 20, 1929 |
| 1,896,705 | Geisenhoner | Feb. 7, 1933 |